United States Patent [19]
Kunishige

[11] Patent Number: 6,078,409
[45] Date of Patent: Jun. 20, 2000

[54] FILM IMAGE INPUT DEVICE WITH DETACHABLE CARTRIDGE HOLDING UNIT

[75] Inventor: Keiji Kunishige, Hachioji, Japan

[73] Assignee: Olympus Optical Co., Ltd., Tokyo, Japan

[21] Appl. No.: 08/702,019

[22] Filed: Aug. 23, 1996

[30] Foreign Application Priority Data

Aug. 29, 1995 [JP] Japan ................................. 7-220842

[51] Int. Cl.⁷ ................................................. H04N 1/04
[52] U.S. Cl. ........................ 358/487; 358/474; 358/494; 348/96
[58] Field of Search ................................. 358/471, 474, 358/487, 494; 348/96, 98, 97, 373, 374, 375; 396/310, 391, 512, 513

[56] References Cited

U.S. PATENT DOCUMENTS

| | | | |
|---|---|---|---|
| 5,546,122 | 8/1996 | Asami et al. | 348/96 |
| 5,592,253 | 1/1997 | Nishimura et al. | 396/513 |
| 5,600,393 | 2/1997 | Funahashi | 396/513 |
| 5,612,760 | 3/1997 | Okuno | 396/513 |
| 5,757,420 | 5/1998 | Hoshino | 348/96 |
| 5,861,911 | 1/1999 | Oosaka | 348/96 |
| 5,861,912 | 1/1999 | Nanba | 348/96 |

FOREIGN PATENT DOCUMENTS 5-145838  6/1993  Japan.

*Primary Examiner*—Edward L. Coles
*Assistant Examiner*—Mark Wallerson
*Attorney, Agent, or Firm*—Louis Weinstein

[57] ABSTRACT

In a scanner having a film image input unit for reading images from developed film stowed in a cartridge and a cartridge film holding unit capable of being detachably attached to the image input unit and of holding the cartridge, a locking mechanism is used to restrain the film holding unit from being detached from the image input unit immediately before or after pulling the film out of the cartridge is started. It is therefore possible to prevent the imperfect run or rewind of the cartridge film due to a careless operation. It can also be prevented that loaded film is soiled or flawed.

20 Claims, 15 Drawing Sheets

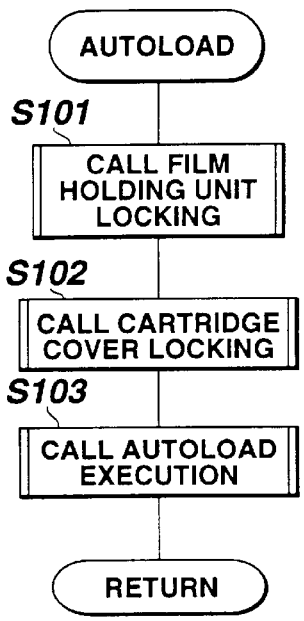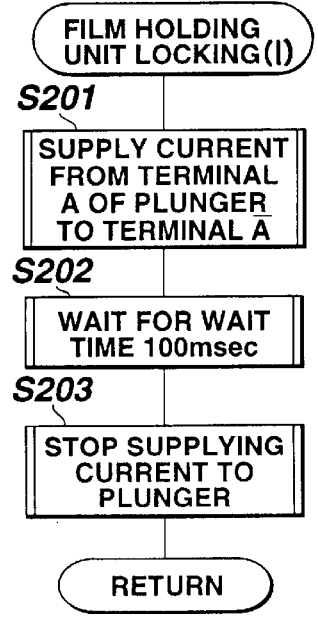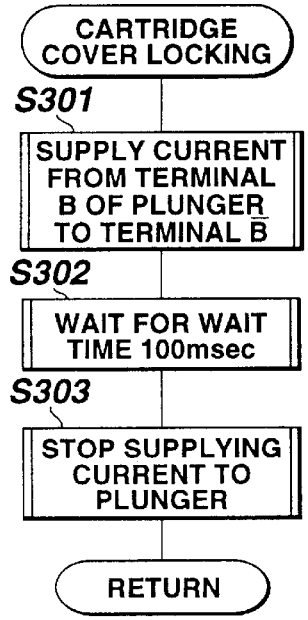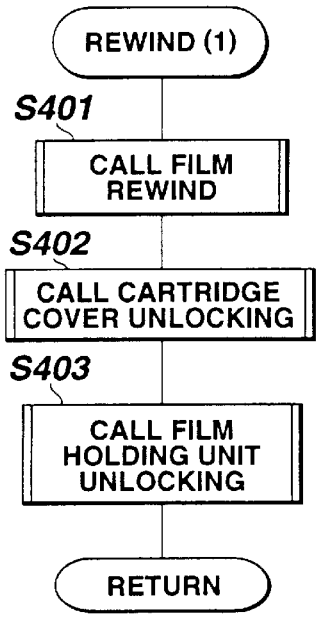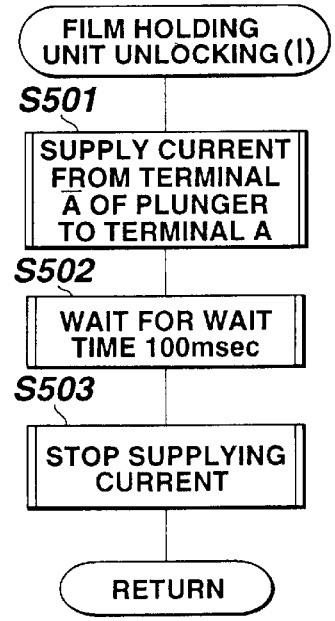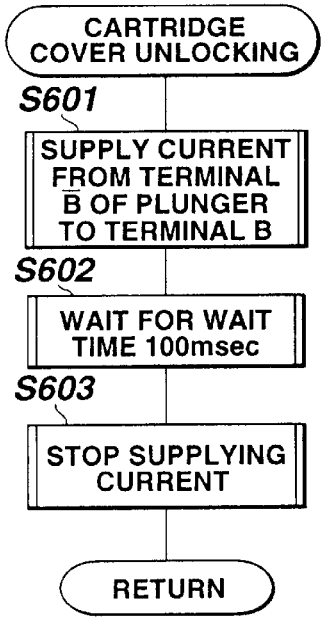

FILM IMAGE INPUT DEVICE WITH DETACHABLE CARTRIDGE HOLDING UNIT

BACKGROUND OF THE INVENTION

1. Field of the Invention

The present invention relates to a scanner having a film image input unit for reading images from developed film stowed in a cartridge and a film holding unit capable of being detachably attached to the film image input unit and of holding the cartridge.

2. Description of the Related Art

What has been proposed in the past as a scanner for inputting images on a plurality of kinds of films such as film stowed in a film cartridge, a strip film, and a piece film includes a file player disclosed in Japanese Unexamined Patent Publication No. 5-145838.

The film player includes a mechanism into which both film stowed in a cartridge and a piece film can be inserted and which consists of gears used to transport the film stowed in the cartridge to a given read position, and a mechanism into which the piece film can be inserted through a port and which consists of feed rollers used to transport the film to the given read position. The film transported to the given read position is illuminated using an illumination light source, and the images on the film are read by a CCD of an imaging device.

Conceivable in contrast with the film player is a scanner comprising an image input unit and a film holding unit capable of being detached freely from the image input unit and usable for various kinds of films. In this case, a scanner adaptable for a plurality of kinds of films can be provided with a relatively simple structure without the necessity of increasing the size of the scanner and making the structure of the scanner complex.

However, as mentioned above, in a scanner structured so that an input holding unit is simply detachable from an image input unit, although film is pulled out of a film cartridge within the film holding unit during operation of the scanner, the film holding unit may be detached from the main unit of the scanner. In this case, there is the fear of causing dust to adhere to the film or flawing the film. Thus, the scanner has a drawback that it is not user-friendly.

OBJECT AND SUMMARY OF THE INVENTION

Accordingly, an object of the present invention is to provide a scanner capable of preventing the imperfect run or rewind of a cartridge film due to careless operation, protecting loaded film from being soiled or flawed, and holding film in a safe state all the time.

A scanner in accordance with the present invention has a film image input unit for reading images from developed film stowed in a cartridge, and a film holding unit capable of being detachably attached to the film image input unit and of holding the cartridge, wherein it is prohibited to detach the film holding unit from the image input unit immediately before or after the film is pulled out of the cartridge. Thus, the loaded film can be protected.

Other features and advantages of the present invention will be fully apparent from the description below.

BRIEF DESCRIPTION OF THE DRAWINGS

FIG. 9A is a flowchart describing subroutine Autoload for automatically loading film in the scanner shown in FIG. 1;

FIG. 9B is a flowchart describing subroutine Film Holding Unit Locking (1) to be called within subroutine Autoload described in FIG. 9A;

FIG. 9C is a flowchart describing subroutine Cartridge Cover Locking to be called within subroutine Autoload described in FIG. 9A;

FIG. 10A is a flowchart describing subroutine Rewind (1) for rewinding film in the scanner shown in FIG. 1;

FIG. 10B is a flowchart describing subroutine Film Holding Unit Unlocking (1) to be called within subroutine Rewind (1) described in FIG. 10A;

FIG. 10C is a flowchart describing subroutine Cartridge Cover Unlocking to be called within subroutine Rewind (1) shown in FIG. 10A;

DESCRIPTION OF THE PREFERRED EMBODIMENTS

Embodiments of the present invention will be described in conjunction with the drawings below.

Figure 1:
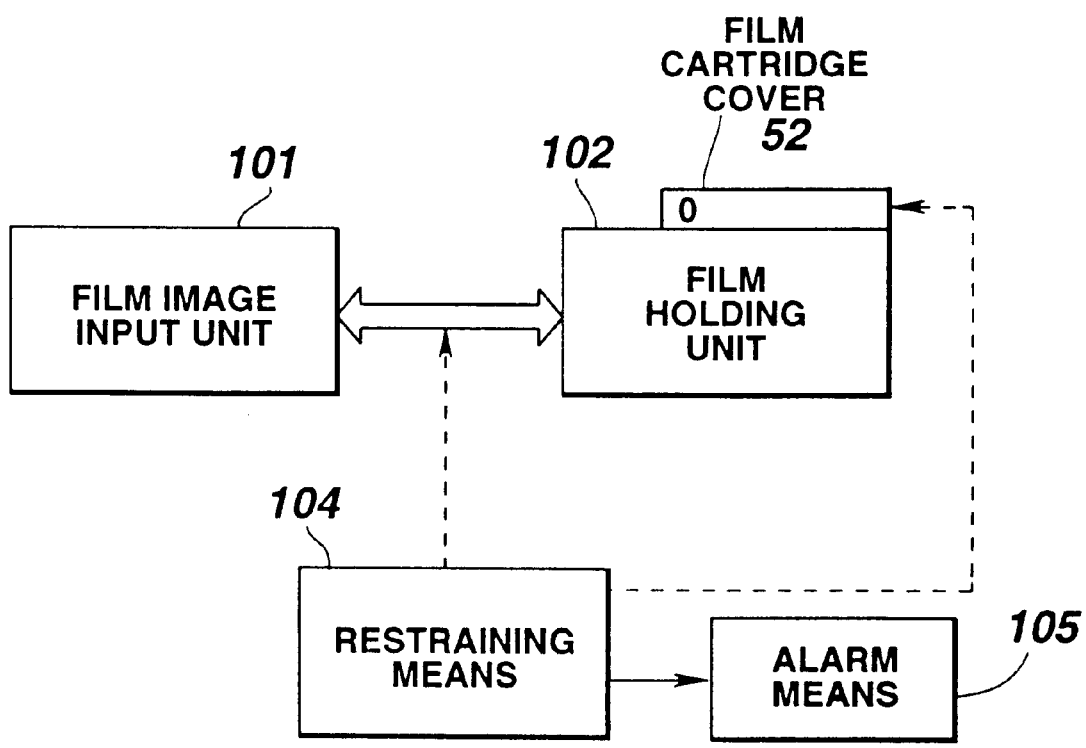
FIG. 1 is a block configuration diagram showing the outline configuration of a scanner of an embodiment of the present invention.

FIG. 1 is a block configuration diagram showing the outline of a scanner of the first embodiment of the present invention.

The scanner of this embodiment comprises a film image input unit 101 having a built-in imaging device as a major component and converting film images into image data, a film holding unit 102 for a film cartridge attachable or detachable to or from the film image input unit 101, a restraining means 104 for restraining detachment of the film holding unit 102 from the film image input unit 101 and restraining opening of a cartridge cover 52 used to load a cartridge and attached to the film holding unit 102, and an alarm means 105 for giving an alarm if the film has been pulled out when an instruction of detaching the film holding unit 102 from the film image input unit 101 is issued via a switch or the like.

In the scanner, the restraining means 104 judges whether or not the film has been pulled out of the film cartridge loaded in the film holding unit 102. If the film has been pulled out, the film holding unit 102 is restrained from being detached from the film image input unit. The cartridge cover 52 of the film holding unit 102 is restrained from being opened. When the film has been pulled out, if it is instructed using an Eject switch to detach the film holding unit 102, the alarm means 105 gives an alarm so as to attract a user's attention.

The scanner of this embodiment will be described below.

The scanner of this embodiment comprises the film image input unit 101, and the cartridge film holding unit 102 or a 35-mm film holding unit 106.

The cartridge film holding unit 102 is a film holding unit in which, as shown in the perspective view of FIG. 5 to be described later, a film cartridge 110 can be loaded. The 35-mm film holding unit 106 is a film holding unit in which, as shown in the oblique view of FIG. 7 to be described later, a film carrier 120 or 125 in which a piece film 112 of 35-mm film or a strip film 127 is inserted can be mounted.

To begin with, the structure of a mechanism in the film image input unit 101 will be described.

Figure 2:
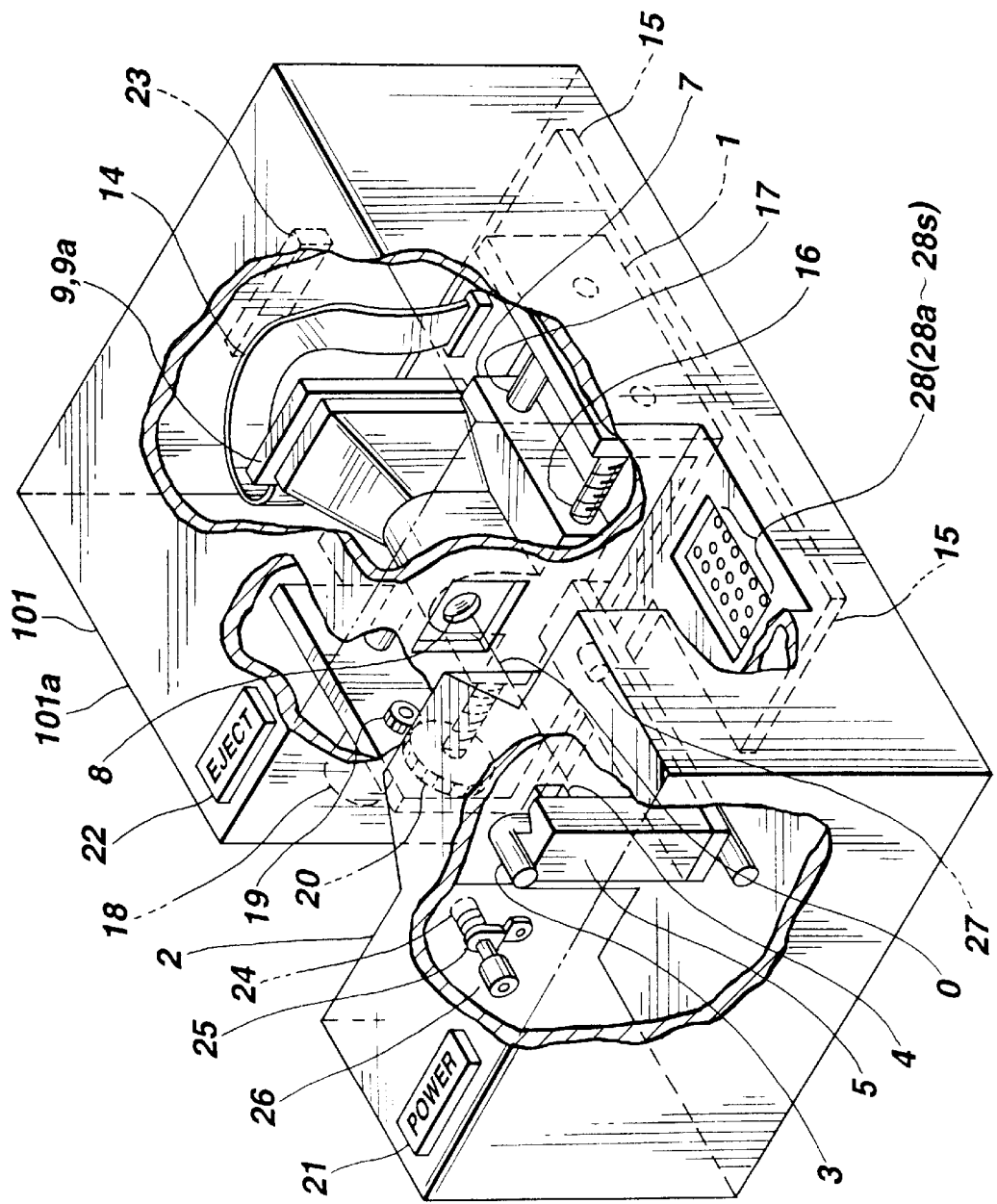
FIG. 2 is a perspective view of a film image input unit constituting the scanner shown in FIG. 1.

FIG. 2 is a perspective view showing the appearance of the film image input unit 101. A main body 101a of the film image input unit 101 has a ditch section 2 in which the cartridge film holding unit 10 or 35-mm film holding unit 106 can be mounted.

A frame 1 is placed in the main body 101a. In the frame, a rotatably-supported screw shaft 16 and a immovably-supported guide shaft 17, which are mutually parallel, are placed in a horizontal direction orthogonal to an optical axis O of a photographic lens that will be described later.

A lens CCD holding member 7 engages with the thread groove of the screw shaft 16 and is supported by the guide shaft 7 so that the lens CCD holding member 7 can slide along the guide shaft 7 freely. The screw shaft 16 is driven to rotate by a stepping motor 18 via a motor pinion 19 and gear 20.

When the screw shaft 16 is driven to rotate by the stepping motor 18, the lens CCD holding member 7 moves along the screw shaft 16. The movement direction is regarded as a sub-scan direction orthogonal to a main scan direction in which an image line is read by a linear CCD 9a.

Supported directly on the lens CCD holding member 7 are a CCD unit 9 for holding the linear CCD 9a and a photographic lens 8 for forming film images projected by illumination light on the linear CCD 9a. A fluorescent lamp 3 serving as a light source for illuminating film is supported unitedly with the lens CCD holding member 7 at a position opposed to the photographic lens 8.

The fluorescent lamp 3 has a bent structure shaped like a right-hand bracket, thus contributing to improvement of space efficiency. The fluorescent lamp 3 is supported while being pressed against a reflector member 5 having a V-shaped groove by means of a fluorescent lamp holding member 4. The longitudinal axis of the fluorescent lamp 3 is parallel to the main scan direction of the linear CCD 9a. The fluorescent lamp 3, photographic lens 8, and linear CCD 9a are aligned with one another along a straight line on the optical axis O.

When the lens CCD holding member 7 is moved along the screw shaft 16, the fluorescent lamp 3, photographic lens 8, and linear CCD 9a are moved in parallel in the axial direction of the screw shaft 16 with the positional relationships retained intact. Thus, a sub-scan is carried out.

The initial position and terminal position of the lens CCD holding member 7 that are regarded as reference positions are detected by a photosensor that is not shown. Based on the reference positions and the number of driving pulses provided by the stepping motor 18, the absolute movement position in the sub-scan direction of the lens CCD holding member 7 is detected. The detection of the absolute movement position makes it possible to prevent the lens CCD holding member 7 from colliding against the wall of the frame 1 or the like.

The number of driving pulses starting with a pulse generated at a reference position is stored as scan position information indicating a scan position in an image plane of film in a memory means, and used as timing control data for fetch of image data from film or for transfer of data to or from a personal computer (PC). The memory means is generally incorporated in the film holding unit 102 because the information to be stored in the memory means is specific to the film holding unit 102.

An output line of the linear CCD 9a is connected to a main printed-circuit board 15, which is placed below the frame 1 with a flexible printed-circuit board 14 between them, by way of a connector.

The other components incorporated in the image input unit 101 include a Power switch 21 for turning on or off the power source and an Eject switch 22 for instructing detachment of the film holding unit with film loaded therein if the detachment is necessary. The Power switch 21 and Eject switch 22 have their tips jutting out from the top of the main body 101a. A connector 23 used to transfer data to or from a personal computer that is not shown is formed on the back side of the main body 101a. These switches and connector connection leads are connected to the main printed-circuit board 15.

Formed on the bottom of the ditch section 2 of the main body 101a is a female connector 28 used for electrical connection with the film holding unit. The female connector 28 consists of a group of contacts that are terminals 28a to 28s formed on the main printed-circuit board 15. The female connector 28 is mated with a male connector 88 or 97 on a film holding unit (See FIGS. 5 or 7) when the film holding unit 102 or 106 is mounted in the ditch section.

Furthermore, the image input unit 101 has a lock pin 24, which serves as a fit means for positioning the film holding unit 102 or 106 and restraining it from being detached, located on the inner side of the ditch section 2 so that the lock pin 24 can project or sink relative to the main body 101a. The lock pin 24 has the back end thereof constrained to go forward or in a projecting direction by means of a blade spring 25. A positioning pin 27 is located at an opposite position of the inner side of the ditch section 2 symmetrical to the lock pin 24 so that the positioning pin 27 can also project or sink freely. The positioning pin 27 has the back end thereof constrained to go forward by means of a blade spring that is not shown.

Located behind the lock pin 24 and blade spring 24 is a locking mechanism 26 serving as a restraining means for controlling a locked state so as to restrain withdrawal of the lock pin 24 according to a control signal sent from an RISC 201 for controlling the scanner which will be described later.

Figure 3:
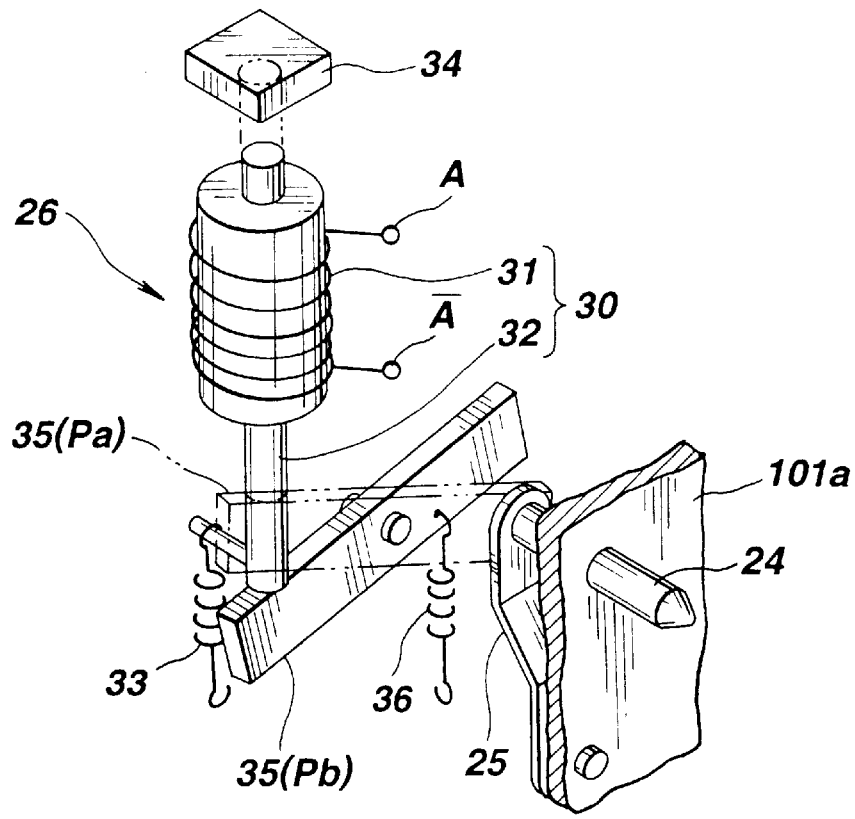
FIG. 3 is an oblique view showing the structure of a locking mechanism adapted for the film image input unit shown in FIG. 2.

The locking mechanism 26 comprises, as shown in the oblique view of FIG. 3, a plunger 30 having a coil 31 and iron core 32, a first spring 33 for constraining the iron core 32 to go downward, a permanent magnet 34 for attracting and holding the iron core 32 at an upper position by overcoming the constraining force of a first spring 33 when the iron core 32 is driven upward, a lock lever 35 rotatably supported on the main body, and a second spring 36 which constrains the lock lever 35 to rotate clockwise and of which constraining torque is smaller than the constraining torque exerted by the first spring 33.

In the locking mechanism 26, when current is supplied in a direction from terminal A of the coil 31 to terminal $\overline{A}$ thereof, the iron core 32 of the plunger 30 is driven upward against the force of the first spring 33 and attracted to the magnet 34. The lock lever 35 rotates clockwise to position Pa, whereby a locked state in which withdrawal of the lock pin 24 is restrained is established. In this state, the fitted state of the lock pin 24 in which the lock pin 24 is fitted into a concave part 54 of the film holding unit 102, which is shown in FIG. 5, is retained. The mounted film holding unit cannot be detached from the image input unit 101. Thereafter, even if supplying the current is stopped, the above state is retained.

When current is supplied in a direction from terminal $\overline{A}$ of the coil 31 to terminal A thereof, the iron core 32 is driven downward against the attraction of the magnet 34. The lock lever 35 rotates counterclockwise to position Pb, whereby an unlocked state in which withdrawal of the lock pin 24 is unrestrained is established. In this state, the lock pin 24 can withdraw from the concave part 54 of the film holding unit 102. The mounted film holding unit can be detached from the image input unit 101. Thereafter, even if supplying the current is stopped, the above state is retained.

A locking mechanism using a motor as a driving source can be adopted as a variant of the locking mechanism 26. In a locking mechanism 41 of the variant, as shown in the oblique view of the locking mechanism of FIG. 4, a rack 44 supported by guide pins 45 so that the rack can slide freely is located behind the lock pin 24 that can project or sink freely and the blade spring 25. The rack 44 is driven rectilinearly to position Pb or position Pa via a pinion 43 along with the forward or reverse rotation of a motor 42. When the rack 44 lies at position Pb, the lock pin 24 is placed in an unlocked state in which the withdrawal of the lock pin 24 is not restrained. When the rack lies at position Pa, a locked state in which the withdrawal is restrained is established.

Next, the structure of the cartridge film holding unit 102 detachable from the image input unit 101 will be described.

Figure 5:
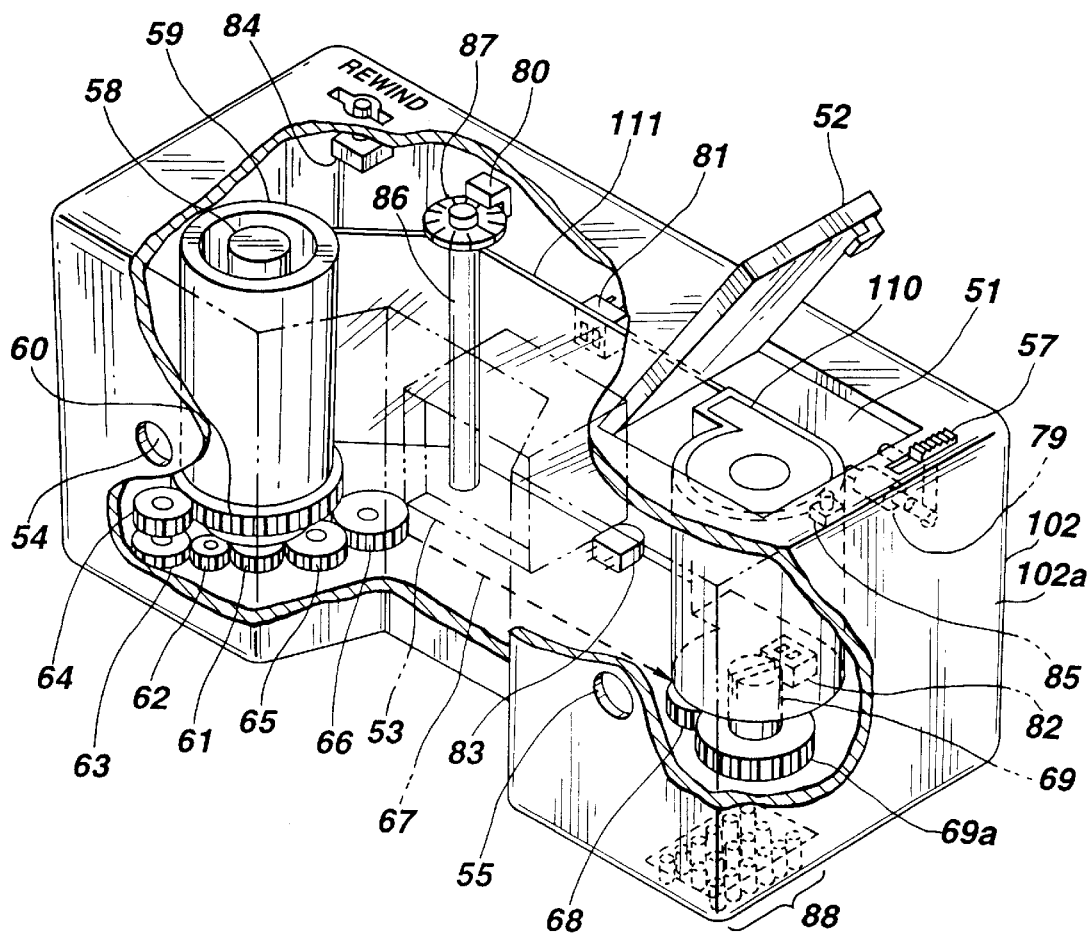
FIG. 5 is a perspective view of a cartridge film holding unit constituting the scanner shown in FIG. 1, that is, a film holding unit attachable to the film image input unit shown in FIG. 2.

FIG. 5 is a perspective view showing the appearance of the cartridge film holding unit 102. A main body 102a of the unit 102 has such an outline that allows the main body 102a to be fitted in the ditch section 2 of the image input unit 101 shown in FIG. 2. The main body 102a has a cartridge chamber 51 that is provided for a stowage of a film cartridge 110. A cartridge port of the cartridge chamber 51 is opened or closed by a cartridge chamber cover 52 supported on the main body 102a so that the cartridge cover 52 can pivot freely.

The cartridge chamber cover 52 can be opened by manipulating a Cover Open knob 57. When film has been pulled out of the cartridge 110, the Cover Open knob 57 has the sliding operation thereof in a direction F, which causes a cover locking mechanism 79 serving as a restraining mean shown in the oblique view of FIG. 6, which will be described later, to open the cover, restrained so that the cover 52 cannot be opened.

A cover switch 85 responsive to the closing operation of the cartridge chamber cover 52 is incorporated in the main body and located near a portion of the main body from or to which the cartridge chamber cover 52 is opened or closed. The switch 85 is turned on or off responsively to the opening or closing of the cover. After loading the cartridge 110, an operator closes the cartridge chamber cover 52. Thus, automatic loading is carried out.

Placed on the top of the main body 102a is the operation knob of a Rewind switch 84 used to give an instruction of rewinding film 111 loaded from the cartridge 110 back into the cartridge 110.

Located in the center of the main body 102a is an illumination opening 53. An image of a frame of the film 111 fed to the position of the opening is read by the image input unit 101.

Formed on the front side of the main body 102a is a concave part 55 (i.e. hole) in which the positioning pin 27 of the image input unit 101 is fitted with the main body 102a mounted in the ditch section 2 of the film input unit 101, and a concave part 54 (i.e. hole) in which the lock pin 24 of the image input unit 101 is fitted. When the pins are fitted in the concave parts 55 and 54, the film holding unit 102 is positioned within the plane perpendicular to the optical axis O.

The lock pin 24 to be fitted in the concave part 54 can be set to a locked state, in which the state in which the lock pin 24 is fitted in the concave part 54 by means of the locking mechanism 26 electrically controlled by the RISC 201 in the image input unit 101 is retained, or to an unlocked state in which the lock pin 24 can withdraw. When the lock pin 24 is fitted in the concave part 54 and thus the locked state is retained, the film holding unit 102 cannot be detached from the film image input unit 101.

Located on the bottom of the main body 102a is a male connector 88 having a group of metallic connection pins each of which is constrained by a spring and which can respectively come into contact with the terminals 28a to 28s of the female connector 28 on the film image input unit 101 when the main body 102a is mounted in the ditch section 2.

Through the group of contacts of the connector 88, the cartridge film holding unit 102 receives unit driving power and film driving control signals from the film image input unit. By contrast, through the contacts of the connector 88, the film image input unit receives information of a magnitude of film feed, film information, film cartridge information, information on an electrically erasable programmable read only memory (EEPROM) in the cartridge film holding unit, information on operation switches incorporated in the cartridge film holding unit, and the like.

The film holding unit 102 has a take-up spool 59 for taking up the film 111 pulled out of the cartridge 110. A motor 58 for winding or rewinding the film 111 is incorporated in the spool 59.

The rotation of a motor pinion 61 fixed to the output shaft of the motor 58 is conveyed to a gear 60 formed along the lower part of the spool 59 via gears 62, 63, and 64 constituting one gear array. The rotation of the motor pinion 61 is conveyed to a gear 69a attached to a drive shaft 69 located in the lower part of the cartridge chamber 51 via gears 65, 66, 67 (a gear array arranged along a path indicated with a dashed line), and 68 constituting the other gear array. The drive shaft 69 is a shaft engaged with a cartridge spool shaft (not shown) and responsible for feeding film during automatic film loading.

A freely-rotatable film follower roller 86 for detecting a magnitude of feeding the film 111 is located along a film running path. The follower roller 86 is a rod member that rotates along with the run of the film 111.

A PI slit disk 87 having thin slits in a radial direction is fixed to the film follower roller 86. With the rotation of the slit disk 87, interception and non-interception of light incident on a photo-interrupter (PI) 80 for detecting a magnitude of a film run attached to the main body 102a are repeated. The magnitude of a run made by the film 111 can be detected by counting the number of output wave pulses of the PI 80.

Also located along the film running path is a photo-reflector (PR) 81 for detecting a film perforation which is used to detect a movement position of film. The output signal of the PR81 is used to detect the position of a film perforation based on which an image plane of a frame of the film 111 is positioned in the opening 53.

Also located along the film running path is a magnetic head 83 for detecting photographic information magnetically recorded on the film 111.

A PR 82 for detecting film cartridge information which is used to detect film information on the film cartridge 110 is placed in the lower part of the cartridge chamber 51.

The motor and sensors are connected to the group of contacts of the male connector 88 via a flexible printed-circuit board that is not shown.

Now, the structure of the cover locking mechanism 79 for restraining the cover opening operation in the F direction of the cover open knob 57 will be described in conjunction with the oblique view of FIG. 6. The cover locking mechanism 79 comprises a plunger 70 having a coil 71 and an iron core 72, a spring 73 for constraining the iron core 72 to move in a G direction, and a permanent magnet 74 for retaining the iron core 72 at terminal position Pb when it has moved in an H direction by overcoming the constraining force of the spring 73 when the iron core 72 is driven in the H direction.

The Cover Open knob 57 is normally constrained to move in an E direction by a spring 75, wherein a stopper section 57a of the knob 57 is engaged with a notch 52a of the cover 52. Thus, the closed state of the cover 52 is retained.

In the cover locking mechanism 79, when current is supplied in a direction from terminal B of the coil 71 to terminal $\overline{B}$ thereof, the iron core 72 is driven in the H direction against the force of spring 73, attracted by the magnet 74, and retained at locking position Pd. Thereafter, even if supplying current is stopped, the state is retained intact. In this state, when the cover 52 is closed, the Cover Open knob 57 is placed in the locked state in which the movement in an F direction is restrained by the iron core 72. The cover 52 cannot therefore be opened.

When current is supplied in a direction from terminal $\overline{B}$ of the coil 71 to terminal B thereof, the iron core 72 is driven in a G direction against the attraction of the magnet 74, and moved to unlocking position Pc. In this state, the Cover Open knob 57 is not restrained by the iron core 72 but is movable in the F direction. The stopper section 57a of the knob 57 is disengaged from the notch 52a of the cover 52 when moved in a J direction, and the cover 52 can be opened.

Next, the structure of the 35-mm film holding unit 106 attachable to the image input unit 101 will be described.

Figure 7:
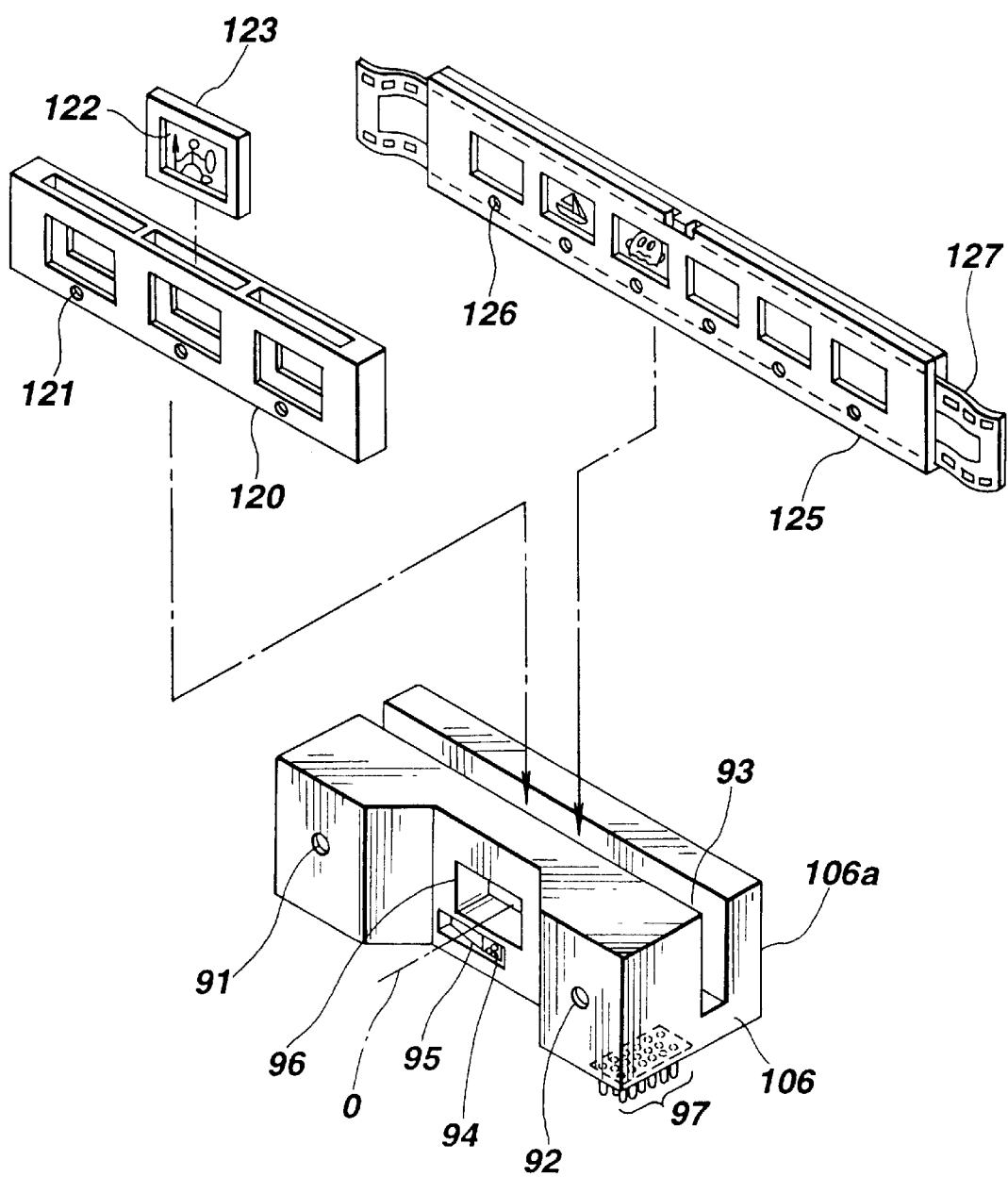
FIG. 7 is an oblique view of a film holding unit constituting the scanner shown in FIG. 1, that is, a 35-mm film holding unit attachable to the film image input unit shown in FIG. 2, a slide film carrier, and a strip film carrier.

The 35-mm film holding unit 106 has, as shown in the oblique view of FIG. 7 showing the appearance, a main body 106a thereof fitted and mounted in the ditch section 2 of the film image input unit 101. Concave parts (i.e. holes) 91 and 92 in which the lock pin 24 and positioning pin 27 of the image input unit can be fitted in the mounted state are formed on the main body 106a. When the pins are fitted, proper positioning is achieved with mounting of the film holding unit.

The main body 106a of the film holding unit 106 has a slit 93 in which either a slide film carrier 120 in which a slide frame 123 designed for a piece of film 122 that is a 35-mm cut film can be inserted, or a strip film carrier 125 designed for a strip film 237 of 35-mm film can be selectively mounted. A pin 94 to be fitted in a concave part 121 or 126 for the purpose of positioning a frame in the carrier 120 or 125 is supported by a blade spring 95 so that the pin 94 can advance or withdraw.

Formed on the bottom of the main body 106a is a group of contacts of a male connector 97 each of which is constrained by a spring force and which come respectively into contact with the group of electrical contacts of the female connector 28 formed on the image input unit when the film holding unit is mounted in the ditch section 2 of the film image input unit.

The 35-mm film holding unit 106 does not in particular have a film driving means for moving the film carrier 120 or 125. The movement of the film carrier is achieved manually. This structure makes it possible to manufacture the film holding unit 106 at a low price. Nevertheless, once the film driving means and magnitude-of-film movement detection means which are included in the aforesaid cartridge film holding unit 102 are added, the film carrier can be moved automatically.

Figure 8:
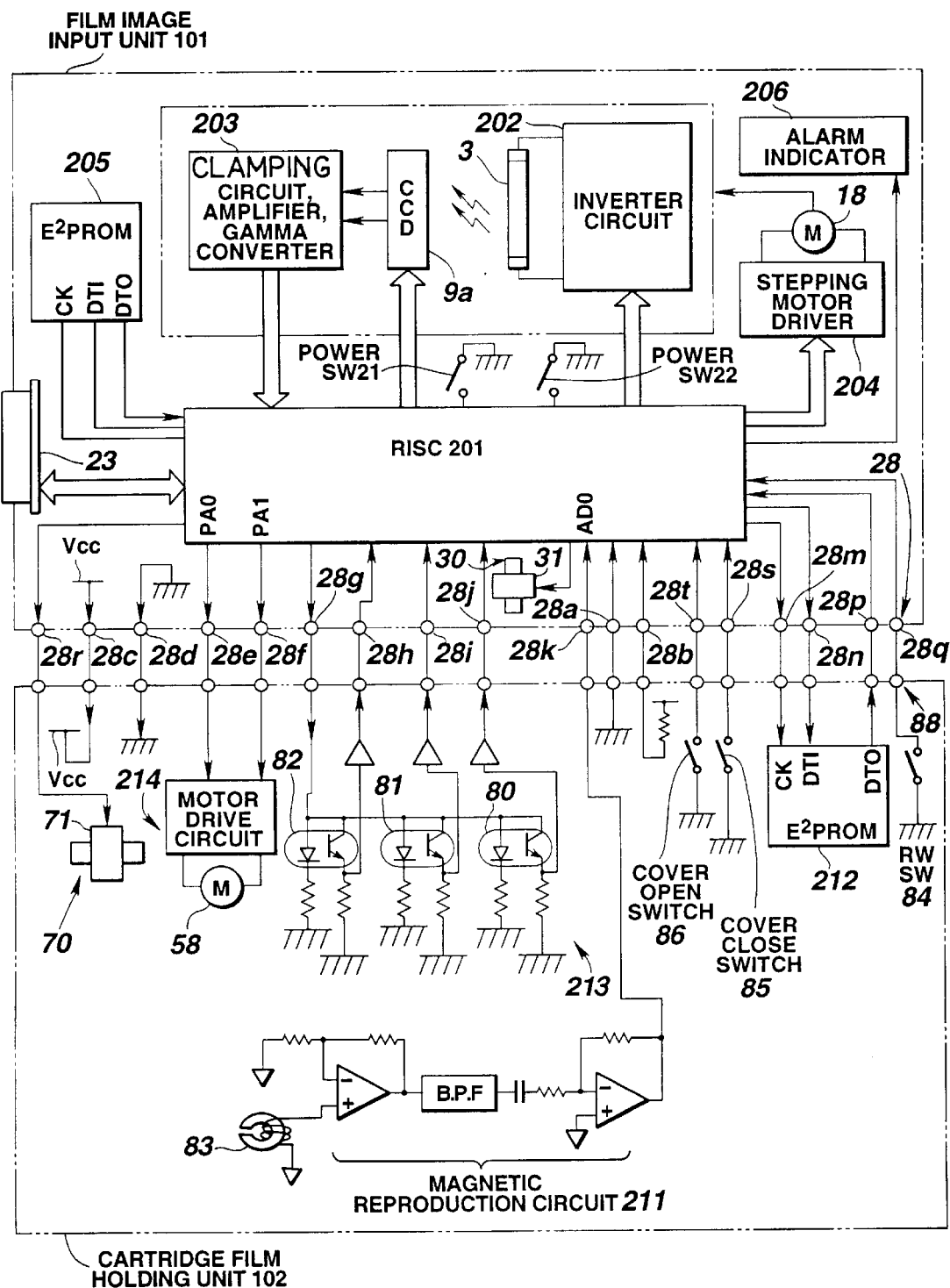
FIG. 8 is a block configuration diagram of electrical circuitry of a film image input unit and cartridge film holding unit constituting the scanner shown in FIG. 1.

Next, the film image input unit 101, cartridge film holding unit 102, and electrical circuitry will be described in conjunction with the electrical circuit block diagram of FIG. 8.

The film image input unit 101 includes a reduced instruction set computer (RISC) 201 that is a reduced instruction set computer for controlling the entire unit, and controlled elements that are controlled by the RISC 201, such as, a fluorescent lamp 3 serving as a light source, an inverter circuit 202 for lighting the fluorescent lamp 3 and controlling an amount of light, a CCD 9a for converting a film image into an electrical signal, an image processing circuit block 203 composed of a clamping circuit, gamma conversion A/D converter, amplifier and the like, a stepping motor 18 for driving in steps the lens CCD holding member 7 having the CCD 9a and the like, a stepping motor driver 204, a plunger 30 for driving the locking mechanism 26, an EEPROM 205 for storing information inherent to the film image input unit, a Power switch 21, an Elect switch 22, an alarm indicator 206 that is an alarm means and gives an alarm using the display by an LCD or the sound by a PCV so as to indicate that film has been pulled out, and a PC connector 23.

The PC connector 23 is a data communication connector and is capable of being connected to a personal computer without the use of an IC dedicated to communications. Data communication with a personal computer is achieved by running communication software in the RISC 201.

The reason why the RISC 201 that is a reduced instruction set computer is used as a control computer will be described. As for the control processing of the scanner, since individual sequences such as a sequence of reading the CCD 9a, a sequence of controlling the image processing circuit 203, a sequence of driving the stepping motor, and a sequence of performing data communication with a personal computer are processing sequences requested to be achieved fast, and a plurality of sequences are executed temporally concurrently, a higher speed is requested.

As a complex instruction set computer (CISC) is employed as a processing and control microcomputer in conventional image input units, so the RISC is adopted for the scanner of this embodiment in an effort to further speed up processing. Thus, a single-controller configuration is attained.

The CISC needs the time coincident with four clocks for execution of one instruction, while the RISC needs the time coincident with only one clock. The RISC can therefore achieve fast processing that is four times as fast as the processing performed by the CISC. Assuming that the CISC can execute signal computation composed of 30 steps during a wait time within each signal control processing, the RISC can achieve signal computation composed of 120 steps. Thus, more advanced and complex signal computation or control processing can be achieved, and a signal-to-noise ratio is improved. Moreover, a larger number of sequences of complex control can be executed in the form of software on a multitask basis.

By the way, the electrical circuitry of the cartridge holding unit 102 will be described. The electrical circuitry includes a magnetic reproduction circuit block 211, an EEPROM 212, a PI/PR detection circuit block 213, a motor drive block 214 composed of a film driving motor 58 and its motor drive circuit, a plunger 70 for driving the cover locking mechanism 79, a Rewind switch (RW SW) 84, a Cover Close switch 85, and a Cover Open switch 86.

The magnetic reproduction circuit block 211 includes a magnetic head 83, a magnetic head output amplifier, a BPF, and a BPF output amplifier. The magnetic reproduction circuit block 211 is a circuit for reading photographic information recorded on film.

Stored in the EEPROM 212 includes information inherent to the film holding unit, such as, a rewind end flag concerning the film cartridge 110, the number of wound film frames, and a focus adjustment value.

The PI/PR detection circuit block 213 consists of a magnitude-of-film run detection circuit including the PI 80 for detecting a magnitude of a film run, a perforation detection circuit including the PR 81 for detecting a film perforation, and a film cartridge information detection circuit including the PR 82 for detecting film cartridge information.

The number of output pulses of the magnitude-of-film run detection circuit indicates a magnitude of a film run. An output pulse of the perforation detection circuit is used to detect the position of a perforation of film. An output pulse of the film cartridge information detection circuit represents an information code concerning a film cartridge which is recorded in a film disk.

A reproduction output terminal of the magnetic reproduction circuit block 211, a signal output terminal of the PI/PR detection circuit block 213, a PI/PR LED lighting control terminal, a data communication terminal of the EEPROM 212, a control terminal of the film driving motor drive block 214, a switch output terminal, and a power/ground input terminal are connected to the RISC 201 through the contacts of the terminals 28a to 28t, which will be described later, of the female connector 28 of the film image input unit 101 by way of the group of contacts or pins of the male connector 88.

The output of the PI/PR detection block 213 is susceptible to noises and therefore output via a buffer. An inverter, operational amplifier, comparator, or the like can be used as the buffer.

The contents of information represented by signals to be applied to the terminals 28a to 28s of the connector 28 are as set forth below.

The terminals 28a and 28b correspond to signal lines of two bits for judging the type of a mounted film holding unit. When the lines are high and low respectively, the cartridge film holding unit 102 is mounted. When the lines are low and high respectively, the 35-mm film holding unit 106 is mounted. When both the lines are low, no holding unit is mounted.

The terminal 28c corresponds to a power (Vcc) line.

The terminal 28d corresponds to a ground (GND) line.

The terminals 28e and 28f correspond to signal lines of two bits for controlling a film drive motor. When the signal lines are high and low respectively, the motor is instructed to rotate forward. When the signal lines are low and high respectively, the motor is instructed to rotate reversely. When both the signal lines are high, the motor is instructed to be braked. When both the signal lines are low, the motor is instructed to be turned off.

The terminal 28g corresponds to a power line for a PR LED or PI LED.

The terminal 28h corresponds to a film disk detection PR output line.

The terminal 28i corresponds to a perforation detection PR output line.

The terminal 28j corresponds to a magnitude-of-film run detection PI output line.

The terminal 28k corresponds to a magnetic reproduction circuit output line.

The terminal 28m corresponds to an EEPROM clock line.

The terminal 28n corresponds to an EEPROM data input line.

The terminal 28p corresponds to an EEPROM data output line.

The terminal 28q corresponds to a Rewind switch output line.

The terminal 28r corresponds to a cover locking mechanism plunger driving current line.

The terminal 28s corresponds to a Cover Close switch output line.

The terminal 28t corresponds to a Cover Open switch output line.

As mentioned above, the film holding unit 102 is connected to the RISC 201 serving as a control means inside the film image input unit 101 via the connectors 28 and 88. The control blocks of the film holding unit 102 and film image input unit 101 are managed in centralized fashion under the control of the RISC.

Owing to the foregoing configuration, the number of parts in a film holding unit can be decreased. This makes it possible to diminish a mounting area. Consequently, manufacturing cost can be reduced, and a more compact design can be realized. Moreover, reliability can be improved because of simplified software deriving from centralized timing control.

Next, Autoload, Rewind, and Ejection to be executed in the scanner of this embodiment will be described in conjunction with FIGS. 9A to 9C, 10A to 10C, and 11A.

FIG. 9A is a flowchart describing subroutine Autoload to be executed when the film cartridge 110 is loaded in the cartridge film holding unit 102 that has been mounted in the image input unit 101.

After the film cartridge 110 is loaded, when the cartridge cover 52 (FIG. 5) is closed, the Cover Close switch 85 is turned on. The RISC 201 in FIG. 8 senses the off-to-on transition of the switch and starts Autoload described in FIG. 9A. Thus, once the cartridge cover 52 is closed, Autoload is started. A user need not enter an instruction of film wind separately. Thus, the scanner is easy to use with good operability.

First, at step S101, subroutine Film Holding Unit Locking (1) is called. Film Holding Unit Locking (1) is, as described later in the flowchart of FIG. 9B, the processing for locking the lock pin 24 (FIGS. 2 and 3), that is, disabling the lock pin 24 from withdrawing by means of the locking mechanism 26 so as to restrain detachment of the film holding unit 102.

By thus locking the film holding unit 102, it can be prevented that when film has been pulled out, the film holding unit 102 is detached carelessly from the image input unit 101, electrical control is disabled, and the film cartridge 110 is halted with film fed imperfectly.

Next, at step S102, subroutine Cartridge Cover Locking described in FIG. 9C, which will be explained later, is called. This is the processing for locking the cartridge cover 52 so that the cartridge cover cannot be opened. By thus locking the cartridge cover 52, it can be prevented that the cartridge 110 is unloaded during pulling of film, and the film 111 is soiled or flawed.

Thereafter, at step S103, subroutine Autoload Execution is called. Film feed is started. Thereafter, control is returned to a main routine.

FIG. 9B is a flowchart describing subroutine Film Holding Unit Locking (1) to be called at step S101.

At step S201, current is supplied from terminal A of the coil 31 of the plunger 30 for driving the locking mechanism 26 shown in FIG. 3 to terminal $\overline{A}$. This causes the iron core 32 to move upward against the constraining force of the first spring 33. The iron core 32 is then attracted to the magnet 34 and stabilized. At step S202, it is waited for a wait time of 100 msec. that the iron core is attracted to the magnet and stabilized. In this state, the locking mechanism 26 is locked, and the film holding unit is disabled from being detached.

At step S203, supplying current to the plunger coil is stopped. The subroutine is terminated.

FIG. 9C is a flowchart describing subroutine Cartridge Cover Locking to be called at step S102.

Figure 6:
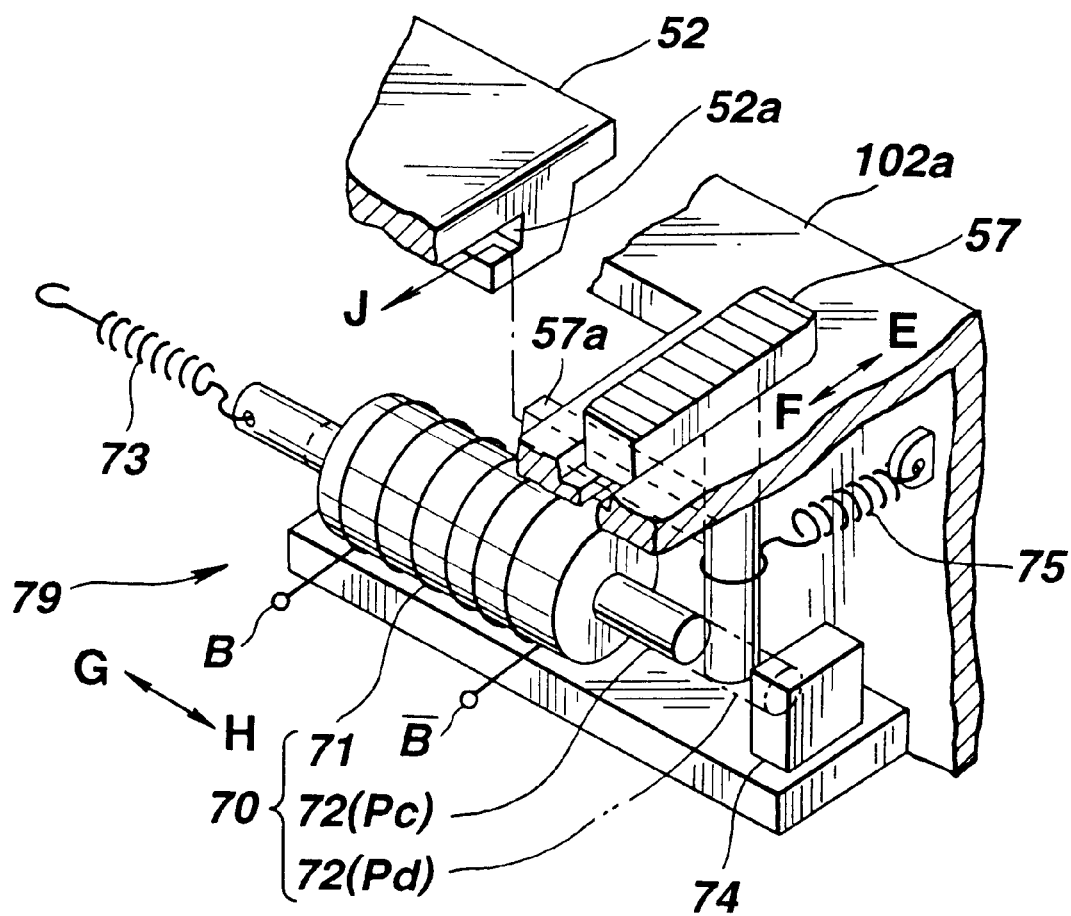
FIG. 6 is an oblique view showing the structure of a cartridge cover locking mechanism incorporated in the cartridge film holding unit shown in FIG. 5.

At step S301, current is supplied in a direction from terminal B of the coil 71 of the plunger 70 shown in FIG. 6 to terminal $\overline{B}$ thereof. This causes the iron core 72 of the plunger 70 to move against the constraining force of the spring 73. The iron core 72 is then attracted to the magnet 74 and stabilized. At step S302, it is waited for a wait time of 100 msec. that the iron core is attracted to the magnet and stabilized. In this locked state, the Cover Open knob 57 has the movement thereof in the F direction restricted, and it becomes impossible to open the cartridge cover 52.

At step S303, supplying current to the plunger coil 71 is stopped. This subroutine is terminated.

Next, Rewind will be described in conjunction with the flowchart of routine Rewind (1) of FIG. 10A.

Rewind (1) is such that when the film holding unit 102 is attached to the image input unit 101, after image fetch is completed or film is pulled out, if the operation button of the Rewind switch 84 (FIG. 5) is pressed, the RISC 201 senses the off-to-on transition of the switch and starts Rewind.

First, at step S401, subroutine Film Rewind is called. The film 111 is then rewound into the cartridge 110. At step S402, subroutine Cartridge Cover Unlocking described in FIG. 10C is called. At step S403, subroutine Film Holding Unit Unlocking described in FIG. 10B is called. After the unlocking is executed, this routine is terminated and control is returned to the main routine.

FIG. 10B is a flowchart describing subroutine Film Holding Unit Unlocking (1) to be called at step S403.

At step S501, current is supplied in a direction from terminal $\overline{A}$ of the coil 31 of the plunger 30 shown in FIG. 3 to terminal A thereof. This causes the iron core 32 of the plunger 30 to move against the attraction of the magnet 34 in a direction in which the constraining force of the first spring 33 works. The locked state is then released. At step S502, it is waited for a wait time of 100 msec. that the iron core 32 is fully separated from the magnet 34. In the unlocked state, it is possible to withdraw the lock pin 24 and to detach the film holding unit.

At step S503, supplying of current to the coil 31 of the plunger 30 is stopped. This subroutine is terminated.

Subroutine Cartridge Cover Unlocking to be called at step S402 will be described in conjunction with the flowchart of FIG. 10C.

At step S601, current is supplied in a direction from terminal $\overline{B}$ of the coil 71 of the plunger 70 shown in FIG. 6 to terminal B thereof. This causes the iron core 72 of the plunger 70 to move to an unlocking position against the attraction of the magnet 74 in a direction in which the constraining force of the spring 73 works. At step 602, it is waited for a wait time of 100 msec. that the iron core 72 is fully separated from the magnet 74. In the unlocked state, it is possible to move the Cover Open knob 57 in the F direction and to open the cartridge cover 52.

At step S603, supplying current to the plunger is stopped. This subroutine is terminated.

Figure 11A:
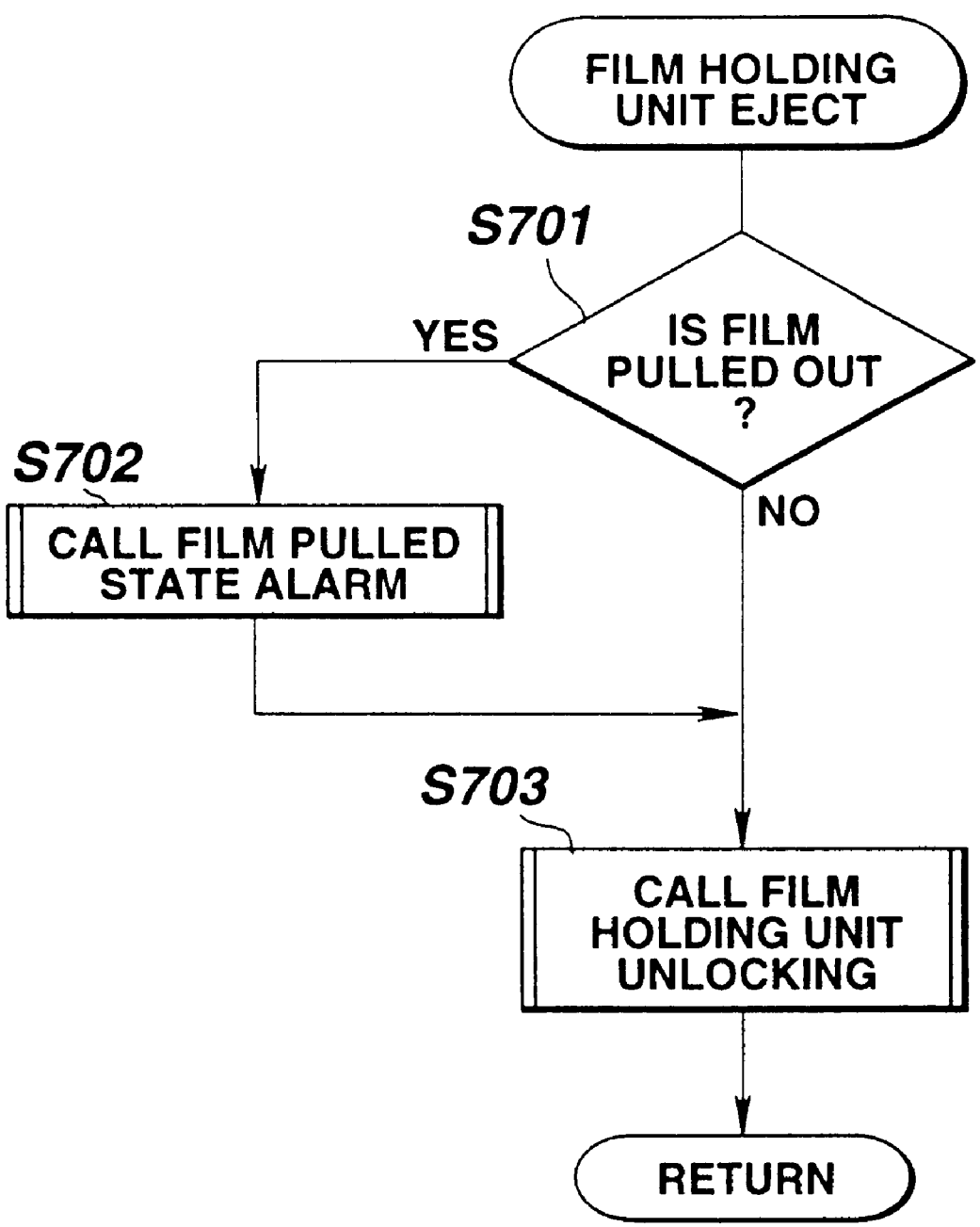
FIG. 11A is a flowchart describing subroutine Film Holding Unit Ejection for ejecting a film holding unit from the scanner shown in FIG. 1.

Next, ejection of a film holding unit will be described in conjunction with the flowchart of routine Ejection of FIG. 11A.

Ejection is such that when the film holding unit 102 is attached to the image input unit 101, after film is pulled out, if the operation button of the Eject switch 22 (FIGS. 2 and 8) is pressed because it becomes necessary to detach the film holding unit 102 from the image input unit 101, the RISC 201 senses the off-to-on transition of the switch, checks if the film has been pulled out, and enables detachment of the film holding unit 102 from the image input unit 101. If the film 111 has been pulled out of the cartridge 110, an alarm is given. A user can therefore recognize clearly that the film has been pulled out, and then detach the film holding unit forcibly. Thus, careless detachment of the film holding unit can be prevented, and it becomes possible to clean away dust from the surface of film.

When turning on the Eject switch 22 is detected, this processing is started. At step S701, the RISC 201 detects whether or not the film 111 has been pulled out. If the film has been pulled out, control is jumped to step S702. If the film has not been pulled out, control is jumped to step S703.

At step S702, routine Film Pulled State Alarm is called. Alarm is such that the alarm indicator 206 makes an alarm sound using a PCV, gives an alarm indication by lighting an LED, displays an alarm mark or alarm message using an LCD, or the like. The other various kinds of processing such as displaying an alarm mark or alarm message on a monitor of a personal computer are conceivable. As long as it is possible to draw user's attention to a film pulled state, any kind of processing can be adopted.

At step S703, subroutine Film Holding Unit Unlocking is called. This processing is described in the flowchart of FIG. 10B. Thereafter, control is passed from this routine to the main routine.

Figure 11B:
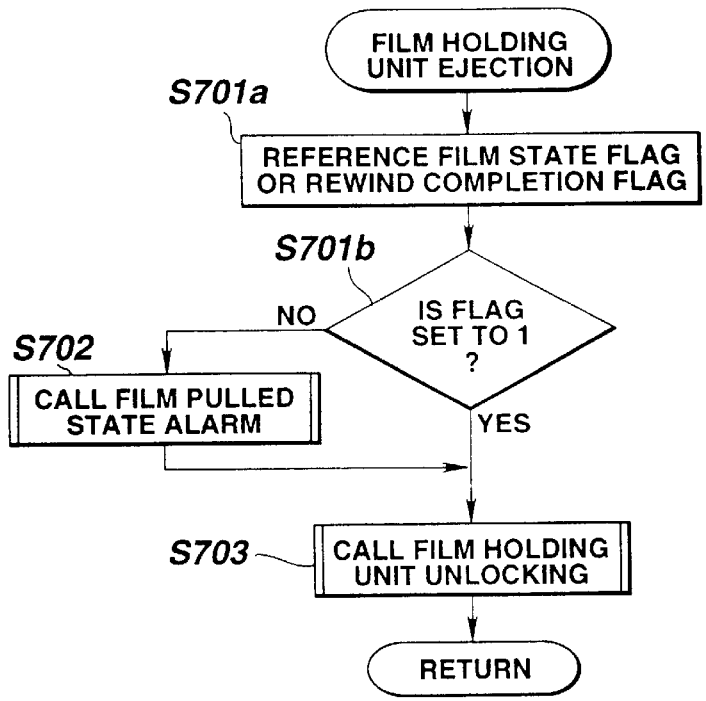
FIG. 11B is a flowchart describing a variant of subroutine Film Holding Unit Ejection described in FIG. 11A.
Figure 11C:
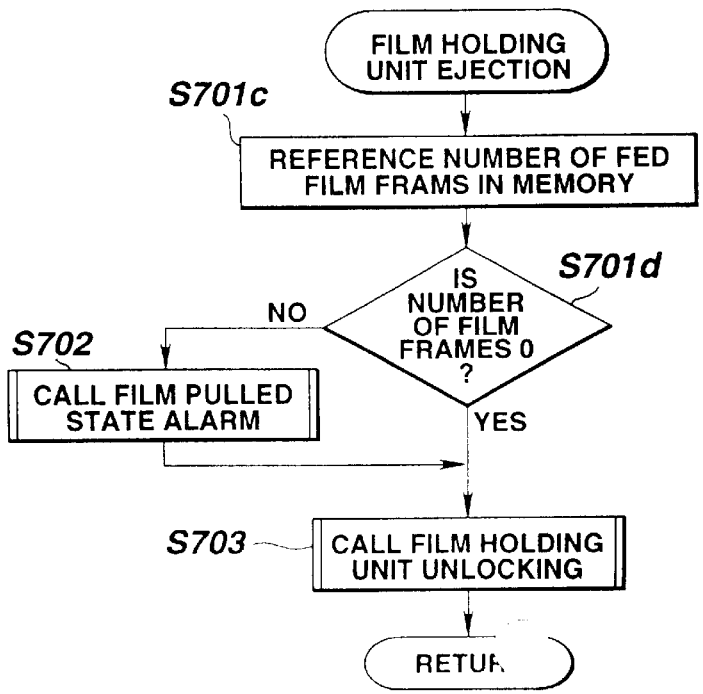
FIG. 11C is a flowchart describing another variant of subroutine Film Holding Unit Ejection described in FIG. 11A.

For judging at step S701 whether or not film has been pulled out, a status flag such as a rewind completion flag or film pulled state flag may be referenced or the number of fed film frames may be checked. Any of the methods can be adopted. FIGS. 11B and 11C describe subroutine Film Holding Unit Ejection using the respective methods.

In subroutine Film Holding Unit Ejection of FIG. 11B, at step S701a, a film state flag or rewind completion flag stored in the EEPROM 212 serving as a film state recording means is referenced. At step S701b, it is judged whether or not the flag is set to 1, that is, film has been pulled out. Specifically, if the flag is not set to 1 (film has been pulled out), control is jumped to step S702. If the flag is set to 1 (film has not been pulled out), control is jumped to step S703.

In subroutine Film Holding Unit Ejection of FIG. 11C, at step S701c, a number-of-fed film frames flag stored in the EEPROM 212 serving as a film state recording means is referenced. At step S701d, it is judged whether or not the number of frames is 0, that is, film has been pulled out. Specifically, if the number of frames is not 0 (film has been pulled out), control is jumped to step S702. If the number of frames is 0 (film has not been pulled out), control is jumped to step S703.

Figure 11D:
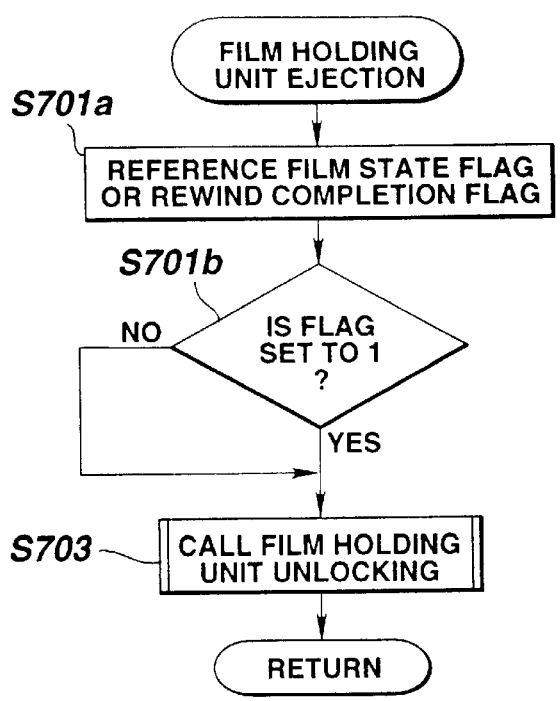
FIG. 11D is a flowchart describing yet another variant of subroutine Film Holding Unit Ejection described in FIG. 11A.
Figure 11E:
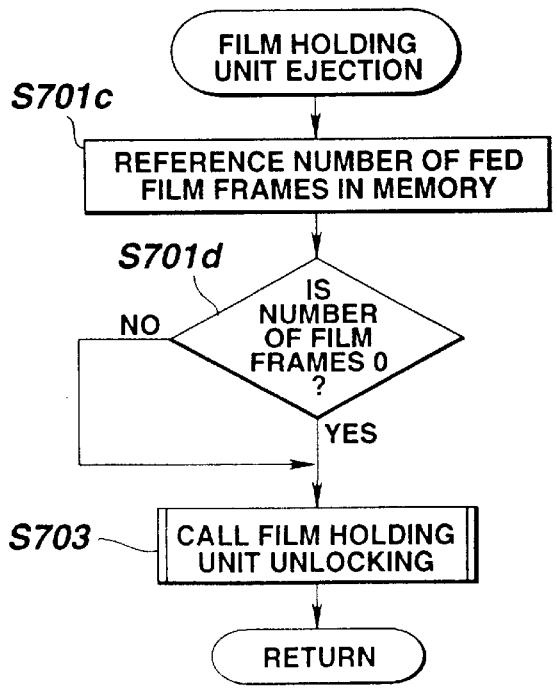
FIG. 11E is a flowchart describing yet another variant of subroutine Film Holding Unit Ejection described in FIG. 11A.

The above description has proceeded on the assumption that alarm is executed at step S702, and then unlocking is performed at step S703. Alternatively, as described in the flowchart of subroutine Film Holding Unit Ejection of FIG. 11D or 11E, the film state flag, the rewind completion flag, or the number of fed film frames may be referenced so that when film has been pulled out, unlocking is not performed but detachment of the film holding unit from the film image input unit is prohibited. Owing to this processing, film pulled out of a cartridge will not be exposed but the film can be protected reliably.

Next, ejection of a film cartridge will be described in conjunction with the flowchart of subroutine Film Cartridge Ejection of FIG. 12A.

Herein, the Cover Open knob 57 shown in FIG. 6 shall be connected to a Cover Open switch 86 (See FIG. 8) that is turned on responsive to the opening in the F direction of the knob even if the locking mechanism 79 lies in a locked state.

Ejection is such that when the film holding unit 102 is attached to the image input unit 101, if it becomes necessary to unload the film cartridge 110 from the film holding unit 102, the Cover Open switch 86 is turned on by sliding the Cover Open knob 57 in the F direction, and it is checked if film has been pulled out, so that the film cartridge 110 can be unloaded from the film holding unit 102.

If the film 111 has been pulled out of the cartridge 110, an alarm is given. A user can recognize clearly that film has been pulled out and cannot be unloaded, and can therefore protect the film.

This processing is started when the Cover Open switch 86 is turned on by sliding the Cover Open knob 57 in the F direction. As shown in FIG. 12A, at step S801, the RISC 201 detects whether or not the film 111 has been pulled out. If the film has been pulled out, control is jumped to step S802. If the film has not been pulled out, control is jumped to step S803.

For judging whether or not film has been pulled out, it is thought that a status flag such as a rewind completion flag or film pulled state flag is referenced or that the number of fed film frames is checked. Any of the methods can be adopted. Subroutines using the methods are described in the flowcharts of subroutine Film Cartridge Ejection of FIGS. 12B and 12C.

Figure 12A:
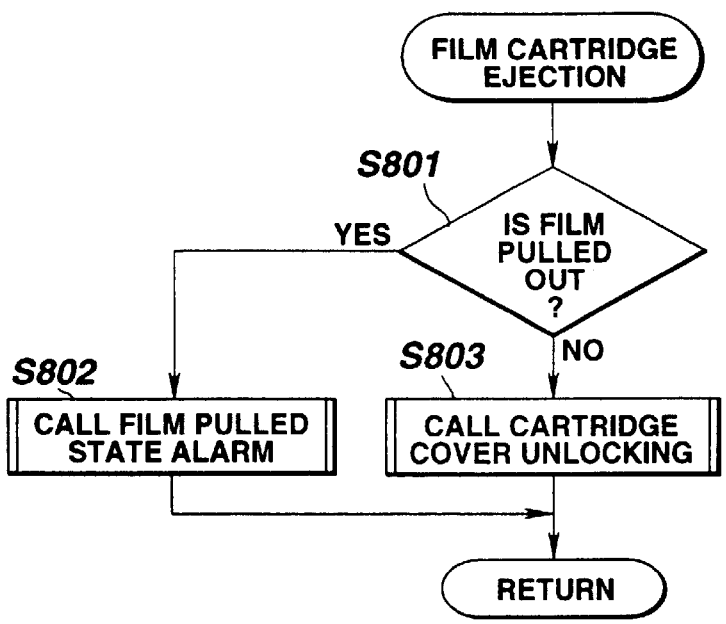
FIG. 12A is a flowchart describing subroutine Film Cartridge Ejection for ejecting a film cartridge from the scanner shown in FIG. 1.
Figure 12B:
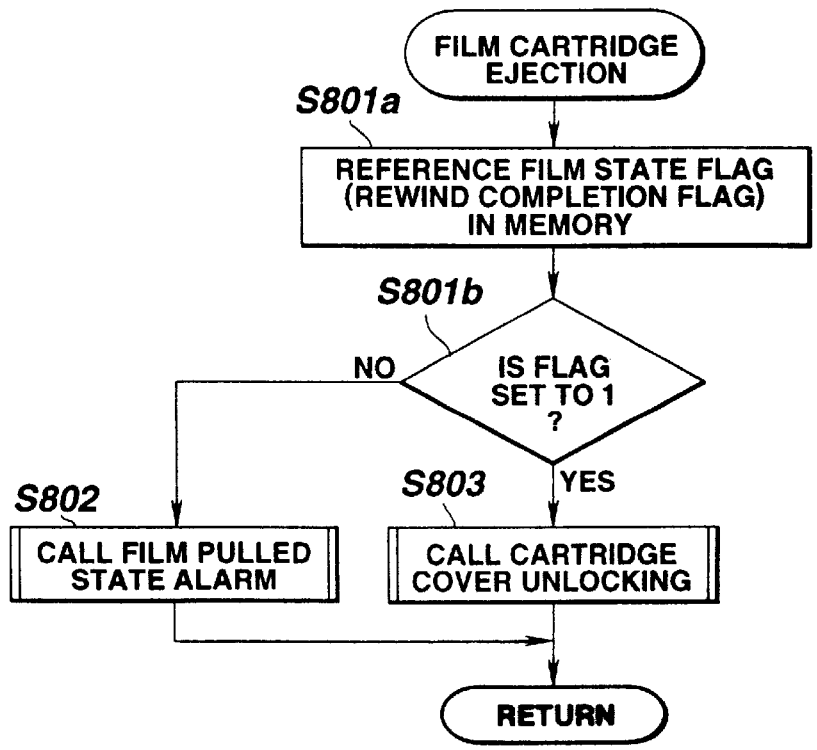
FIG. 12B is a flowchart describing a variant of subroutine Film Cartridge Ejection described in FIG. 12A.

In subroutine Film Cartridge Ejection of FIG. 12B, at step S801a, the film state flag or rewind completion flag stored in the EEPROM 212 serving as a film state recording means is referenced. At step S801b, it is judged whether or not the flag is set to 1, that is, film has been pulled out. Specifically, if the flag is not set to 1 (film has been pulled out), control is jumped to step S802. If the flag is set to 1 (film has not been pulled out), control is jumped to step S803.

Figure 12C:
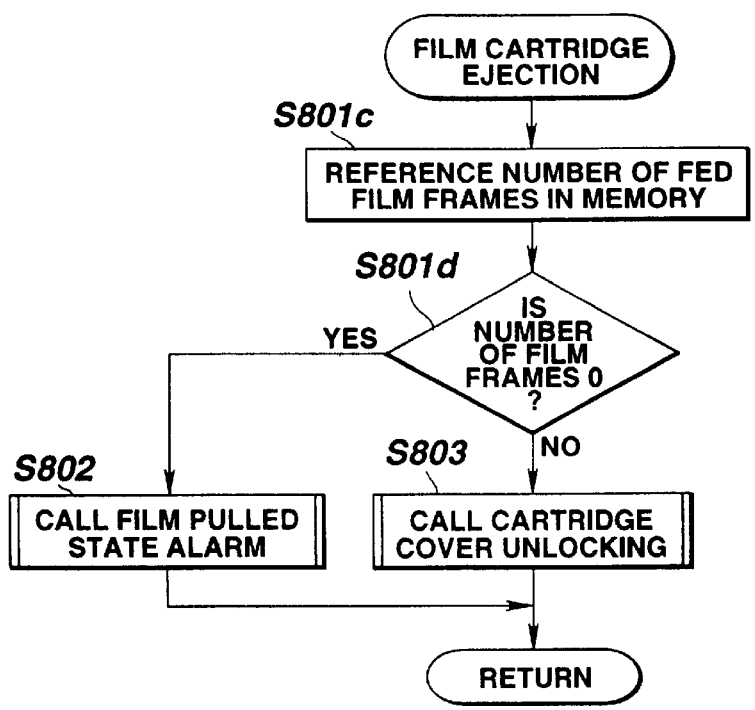
FIG. 12C is a flowchart describing another variant of subroutine Film Cartridge Ejection described in FIG. 12A.

In subroutine Film Cartridge Ejection of FIG. 12C, at step S801c, a number-of-fed film frames flag stored in the EEPROM 212 serving as a film state recording means is referenced. At step S801d, it is judged if the number of frames is 0, that is, film has been pulled out. Specifically, if the number of frames is not 0 (film has been pulled out), control is jumped to step S802. If the number of frames is 0 (film has not been pulled out), control is jumped to step S803.

At step S802 in FIG. 12B or 12C, the routine Film Pulled State Alarm is called. This alarm is the same as the subroutine described in FIG. 11A. At step S803, Cartridge Cover Unlocking is called. Thereafter, control is passed from the subroutine to the main routine.

Figure 12D:
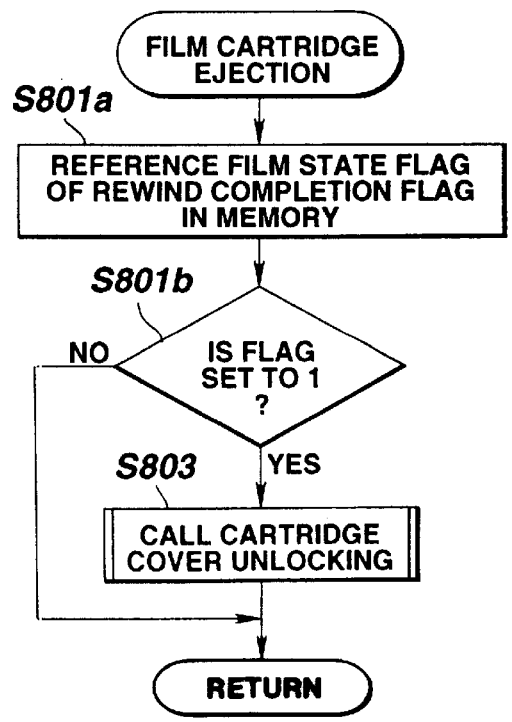
FIG. 12D is a flowchart describing yet another variant of subroutine Film Cartridge Ejection described in FIG. 12A.
Figure 12E:
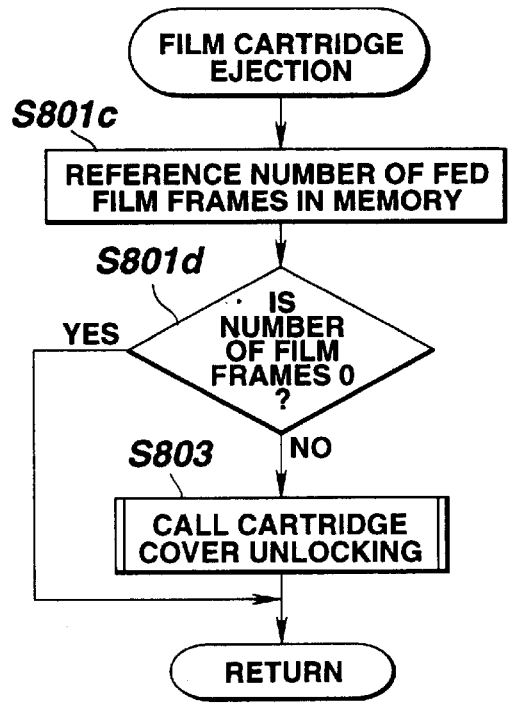
FIG. 12E is a flowchart describing yet another variant of subroutine Film Cartridge Ejection described in FIG. 12A.

In the subroutines described in FIGS. 12A to 12C, alarm is executed at step S802. Alternatively, as described in the flowchart of subroutine Film Cartridge Ejection of FIG. 12D or 12E, a film state flag or rewind completion flag, or the number of fed film frames may be referenced so that when film has been pulled out, alarm is not executed but unloading of a film cartridge from a film holding unit may be prohibited. Using this processing, control can be simplified.

Next, subroutines Film Holding Locking (2) and Film Holding Unit Unlocking (2) to be executed when the locking mechanism 41 shown in FIG. 4, which is a variant of the locking mechanism for the lock pin 24 designed to restrain detachment of a film holding unit, is employed will be described in conjunction with the flowcharts of FIGS. 13A and 13B.

Figure 4:
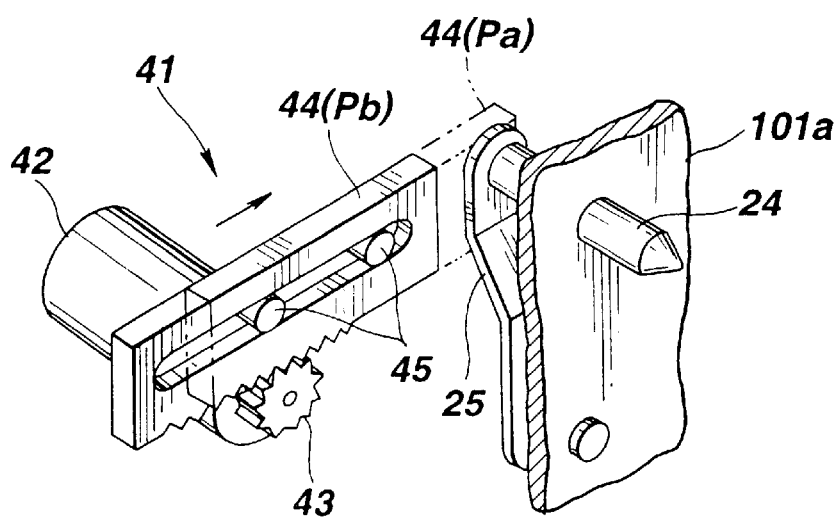
FIG. 4 is an oblique view showing the structure of a variant of the locking mechanism shown in FIG. 3.
Figure 13A:
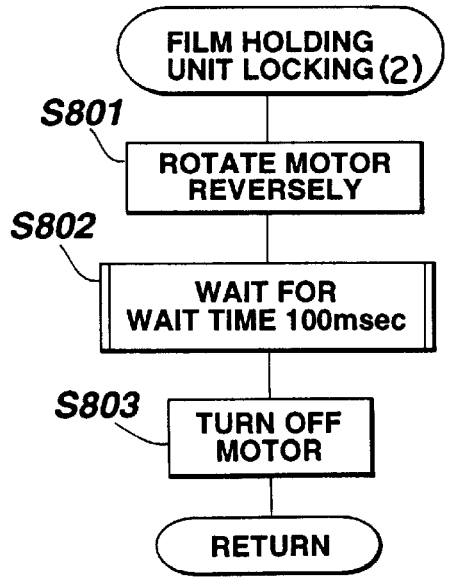
FIG. 13A is a flowchart describing subroutine Film Holding Unit Locking (2) to be executed when a variant of a locking mechanism is adapted for the scanner shown in FIG. 1.

FIG. 13A is a flowchart describing subroutine Film Holding Unit Locking (2) that is a subroutine called at step S101 within Autoload of FIG. 9A in a scanner adopting the locking mechanism 41 of a variant shown in FIG. 4.

At step S801, the motor 42 shown in FIG. 4 is rotated reversely. This causes the rack 44 to move to position Pa. A locked state in which the withdrawal of the lock pin 24 is restrained is established. At step S802, a wait time 100 msec. that is long enough for the rack to be driven to position Pa or a locking position is spent. At step S803, the motor is turned off. This subroutine is terminated.

Figure 13B:
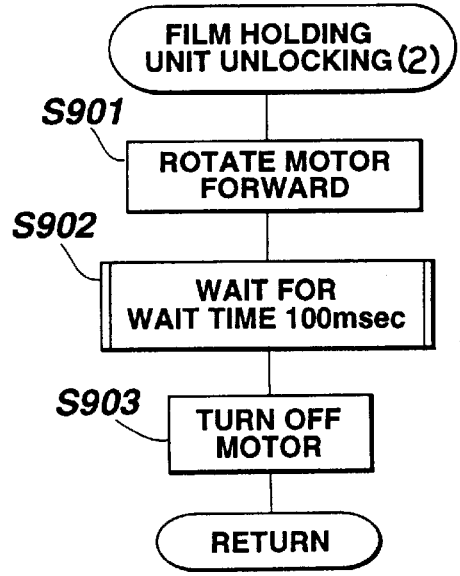
FIG. 13B is a flowchart describing subroutine Film Holding Unit Unlocking (2) to be executed when a variant of a locking mechanism is adapted for the scanner shown in FIG. 1.

FIG. 13B is a flowchart describing subroutine Film Holding Unit Unlocking (2) that is a subroutine called at step S403 within subroutine Rewind (1) of FIG. 10A in the scanner adopting the locking mechanism 41 of a variant.

At step S901, the motor 42 shown in FIG. 4 is rotated forward. This causes the rack 44 to move to position Pb. An unlocked state in which the withdrawal of the lock pin 24 is permitted is established. At step S902, a wait time of 100 msec. that is long enough for the rack 44 to be driven to position Pb or an unlocking position is spent. At step S903, the motor is turned off, and this subroutine is terminated.

In the scanner of this embodiment, loading achieved by executing Autoload, that is, pulling film out of a cartridge is carried out after locking the film holding unit 102 or locking the cartridge cover 52 is completed fully. Alternatively, the loading may be carried out immediately before the locking is completed fully as long as the film 111 will not be damaged or the cartridge will not be hindered from being unloaded.

Likewise, within Rewind, Film Holding Unit Unlocking or Cartridge Cover Unlocking is executed after rewinding the film 111 into the cartridge 110 is completed. Alternatively, the unlocking may be executed immediately before rewinding is completed fully as long as the film 111 will not be damaged or the cartridge 110 will not be hindered from being unloaded.

As described so far, the scanner of this embodiment provides the advantages described below.

(1) While the film 111 is running or when the film 111 has been pulled out of the cartridge 110, the film holding unit 102 is restrained from being detached from the image input unit 101 by means of the locking mechanism 26 or 41. Thus, it can be prevented that the film holding unit is detached carelessly and the power supply is disconnected. Consequently, normal film drive can be guaranteed and the film 111 can be protected fully. It can therefore be prevented that the film is soiled or flawed.

(2) While the film 111 is running or when the film 111 has been pulled out of the cartridge 110, the cartridge cover 52 is restrained from being opened by means of the cover locking mechanism 79 so that the cartridge 110 cannot be unloaded. Owing to this structure, careless unloading of the film 111 can be prohibited, and the film can be protected. It can therefore be prevented that the film is soiled or flawed.

(3) When the film 111 has been pulled out of the cartridge 110, if an attempt is made to eject the film holding unit 102 or 106 from the image input unit, an alarm is given to indicate that the film has been pulled out in response to the ejection instructing operation. A user's attention is thus drawn to the film. Consequently, it can be prevented that the film 111 is soiled or flawed.

Figure 14:
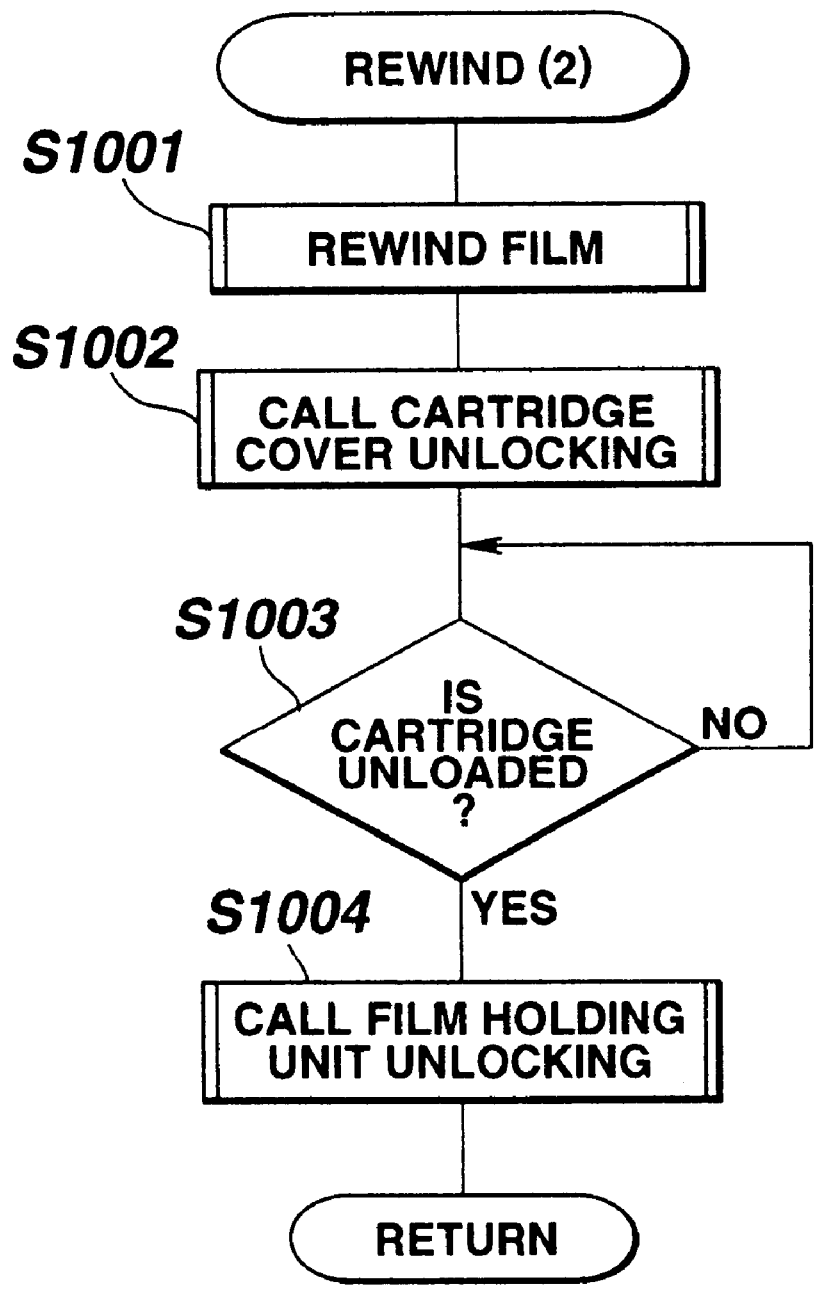
FIG. 14 is a flowchart describing subroutine Rewind (2) that is a variant of subroutine Rewind (1) described in FIG. 10A.

Next, a variant of Rewind to be executed in the scanner of this embodiment will be described. This variant of Rewind is such that after film is rewound by operating the Rewind switch 84, it is checked if a cartridge has been unloaded, and then a film holding unit is unlocked. FIG. 14 is a flowchart describing this variant of Rewind (2).

At step S1001, film is rewound. At step S1002, subroutine Cartridge Cover Unlocking described in FIG. 10C is called.

At step S1003, it is checked if the cartridge 110 has been unloaded. The PR 82 for detecting film cartridge information, which is shown in FIG. 5, is used to detect the film disk, whereby it is judged whether or not the cartridge 110 has been unloaded. It is waited that the cartridge 110 is unloaded.

After the cartridge 110 is unloaded, at step S1004, subroutine Film Holding Unit Unlocking described in FIG. 10B is called. Thereafter, control is returned from this routine to the main routine.

In the scanner in which this variant of subroutine Rewind is implemented, the film 111 is rewound, and then the cartridge cover 52 is unlocked. After it is confirmed that the cartridge 110 has been unloaded from the film holding unit 102, processing is performed so that the film holding unit 102 is enabled to be detached from the image input unit 101. After rewind is completed, if the cartridge 110 remains loaded, the film holding unit 102 cannot be detached from the image input unit 101. Unless it becomes unnecessary to drive film, the film holding unit 102 cannot be detached. The film cartridge 110 and film 111 alike can be protected fully.

As mentioned above, according to a scanner of the present invention, a film holding unit is prohibited from being detached from an image input unit immediately before or after film is pulled out of a cartridge. It can therefore be prevented that the film holding unit is detached carelessly and the power supply is disconnected. Furthermore, the film holding unit is enabled to be detached from the image input unit immediately before or after stowing film in the cartridge is completed. It can therefore be prevented that the film holding unit is detached carelessly and the power supply is disconnected. Normal film drive can be guaranteed, and therefore the film can be protected. Consequently, it can be prevented that the film is soiled or flawed.

According to another scanner of the present invention, when an external instruction is made to detach a film holding unit from a film image input unit, an alarm is given to indicate that film has been pulled out of a cartridge. It is thus prevented that a user carelessly removes the cartridge from which the film has been pulled out. Consequently, it can be prevented that dust adheres to the film or flaws are created on the film.

According to yet another scanner of the present invention, a cartridge is prohibited from being unloaded from a film holding unit immediately before or after film is pulled out of the cartridge. Alternatively, the cartridge is enabled to be unloaded from the film holding unit immediately before or after stowing film in the cartridge is completed. It can therefore be prevented that the cartridge is removed with film pulled out. Consequently, the film can be protected. It can therefore be prevented that the film is soiled or flawed.

According to yet another scanner of the present invention, a film holding unit is enabled to be detached from an image input unit immediately before or after a cartridge is unloaded from the film holding unit. It can therefore be prevented that the film holding unit is detached before the cartridge is unloaded. Consequently, the film can be protected. It can therefore be prevented that the film is soiled or flawed.

What is claimed is:

1. A scanner having a film image input unit for reading images from developed film stowed in a cartridge, and a film holding unit capable of being detachably attached to said film image input unit and of holding said cartridge, comprising:

said film holding unit comprising a first housing enclosing said cartridge independently of said image input unit and having opposing first and second sidewalls having external shapes different from one another;

said image input unit comprising a second housing enclosing means for reading an image from developed film, said second housing having an external surface provided with a ditch selection having a bottom and opposing first and second sidewalls, said first and second sidewalls having external surfaces provided with shapes that respectively conform to the shapes of the first and second sidewalls of said film holding unit facilitate proper insertion and removal of said film holding unit from said ditch section;

a means for instructing to detach said film holding unit from said image input unit;

a film drive means for feeding said film; and a restraining means for prohibiting detachment of said film holding unit from said image input unit; wherein:

said film drive means rewinds said film in response to a command from said detachment instruction means; and said restraining means is freed during one of a time immediately before and a time after the rewind is completed.

2. A scanner according to claim 1, wherein said restraining means includes a fit member for joining said film holding unit and image input unit, a restraining member for restraining the movement of said fit member, and a drive means for driving said restraining member.

3. The scanner of claim 1 wherein said ditch section is an integral part of said second housing, enabling insertion of the first housing into said ditch section without opening said second housing.

4. The scanner of claim 3 wherein said first housing is provided with a cover lid movable between an open position exposing an opening and a closed position, covering said opening, said opening being provided for insertion or removal of a film cartridge.

5. The scanner of claim 3 further comprising an alignment opening in said first housing; and a locking member movably mounted along said ditch section for insertion into said alignment opening when said first housing is properly seated in said ditch section.

6. The scanner of claim 5 wherein said the second housing further includes a restraining assembly for restraining movement of said locking member away from said first housing.

7. The scanner of claim 6 wherein said restraining assembly is powered by a controller and includes means to retain the restraining assembly in the restraining condition even in the absence of power from the controller.

8. The scanner of claim 7 wherein the controller selectively provides a first power signal for operating the restraining assembly to the restraining condition and a second power signal to operate the restraining assembly to release the locking member from the restraining assembly.

9. The scanner of claim 5 wherein the locking member is retained in the second housing by a resilient member and said restraining assembly urges the locking member outwardly from said second housing against a force of the resilient member when the restraining means is operated to the restraining condition.

10. The scanner of claim 3 wherein said ditch section extends to opposing ends of said second housing to expose end walls of said first housing, enabling gripping of the end walls of said first housing to facilitate insertion and removal of said first housing from said second housing.

11. The scanner of claim 3 wherein a controller in said second housing controls the restraining assembly in said first housing.

12. The scanner of claim 3 wherein said first housing encloses a film cartridge, a means for winding film drawn out of a cartridge in said first housing and a means for rewinding said film into said cartridge.

13. The scanner of claim 12 further including a controller in said second housing for controlling said winding and unwinding means.

14. The scanner of claim 5 further comprising a locking assembly for locking and unlocking said cover lid; and a restraining assembly for preventing said lid locking assembly from unlocking when film extends from said cartridge.

15. A scanner having a film image input unit for reading images from developed film stowed in a cartridge, and a film holding unit capable of being detachably attached to said film image input unit and of holding said cartridge, comprising:

said film holding unit comprising a first housing enclosing said cartridge independently of said image input unit and having opposing first and second sidewalls having external shapes different from one another;

said image input unit comprising a second housing enclosing means for reading an image from developed film, said second housing having an external surface provided with a ditch selection having a bottom and opposing first and second sidewalls, said first and second sidewalls having external surfaces provided with shapes that respectively conform to the shapes of the first and second sidewalls of said film holding unit facilitate proper insertion and removal of said film holding unit from said ditch section;

a means for instructing to unload said cartridge from said film holding unit;

a film drive means for feeding said film; and a restraining means for prohibiting unloading of said cartridge from said film holding unit; wherein:

said film drive means rewinds said film in response to a command from said unloading instruction means; and said restraining means is freed at one of a time immediately before and a time after the rewind is completed.

16. A scanner according to claim 15, wherein said restraining means includes a fit member designed for a cartridge cover of said film holding unit, a restraining member for restraining the movement of said fit member, and a drive means for driving said restraining member.

17. A scanner according to claim 2 or 16, wherein said drive means for driving said restraining member is a plunger or motor.

18. A scanner, comprising:

a main unit for reading images from developed film stowed in a cartridge;

an adaptor capable of being detachably attached to said main unit and of holding said cartridge;

a restraining mechanism for prohibiting detachment of said adaptor from said main unit;

a detecting mechanism for detecting removal of said cartridge from said adaptor; and a control mechanism that when said detecting mechanism detects removal of said cartridge, frees said restraining mechanism and permits detachment of said adaptor from said main unit.

19. A scanner having a film image input unit for reading images from developed film stowed in a cartridge, and a film holding unit capable of being detachably attached to said film image input unit and of holding said cartridge, characterized in that:

said film holding unit includes:

a cartridge chamber for stowing said film;

a cartridge chamber cover;

a cover switch for detecting opening or closing of said cartridge chamber cover; and a film feed means; and after said cartridge is stowed in said cartridge chamber, when said cover switch detects an open-to-close-transition of said cartridge chamber cover, said feed means feeds said film.

20. A scanner having a film image input unit for reading images from developed film stowed in a cartridge, and a film holding unit capable of being detachably attached to said film image input unit and of holding said cartridge, comprising:

said film holding unit comprising a first housing enclosing said cartridge independently of said image input unit and having opposing first and second sidewalls having external shapes different from one another;

said image input unit comprising a second housing enclosing means for reading an image from developed film, said second housing having an external surface provided with a ditch section having a bottom and opposing first and second sidewalls, said first and second sidewalls having external surfaces provided with shapes that respectively conform to the shapes of the first and second sidewalls of said film holding unit to facilitate proper insertion and removal of said film holding unit from said ditch section; and means for preventing said film holding unit from being detached from said image input unit during one of a time before film is pulled out of said cartridge and at time after film is pulled out of said cartridge.

* * * * *